US007668156B2

(12) United States Patent
Ho

(10) Patent No.: US 7,668,156 B2
(45) Date of Patent: *Feb. 23, 2010

(54) APPARATUS AND METHOD FOR A VOICE PORTAL

(75) Inventor: Chi Fai Ho, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/019,411

(22) Filed: Dec. 20, 2004

(65) Prior Publication Data

US 2006/0133348 A1   Jun. 22, 2006

(51) Int. Cl.
*H04L 12/66* (2006.01)
(52) U.S. Cl. ...................................... 370/352
(58) Field of Classification Search ................. 370/352; 379/88.17; 709/200–209, 217–219, 224; 704/205, 257; 455/466, 574, 411, 558
See application file for complete search history.

(56) References Cited

U.S. PATENT DOCUMENTS

| 6,842,767 | B1* | 1/2005 | Partovi et al. ............... 709/203 |
| 2001/0038624 | A1* | 11/2001 | Greenberg et al. ........... 370/352 |
| 2003/0002635 | A1* | 1/2003 | Koch et al. ............... 379/88.17 |
| 2004/0225499 | A1* | 11/2004 | Wang et al. ................. 704/257 |
| 2005/0163136 | A1* | 7/2005 | Chiu et al. .................. 370/401 |
| 2006/0026629 | A1* | 2/2006 | Harris et al. .................. 725/32 |

* cited by examiner

*Primary Examiner*—Melody Mehrpour
(74) *Attorney, Agent, or Firm*—North Shore Patents, P.C.; Michele Liu Baillie

(57) ABSTRACT

A voice portal and a method for operating a voice portal are disclosed. In one embodiment of the present invention, voice a voice portal is connected to multiple telephones of various protocols by both a voice signal interface and a data signal interface. The voice portal is also connected to one or more telephony networks. The voice portal is capable of receiving requests for functions from the telephones; retrieving the requested functions from memory and sending the functions back to the telephone for execution. The functions supplied by the voice portal are programmable and customizable and control all functions of the telephones.

31 Claims, 7 Drawing Sheets

Accessing a Contact List

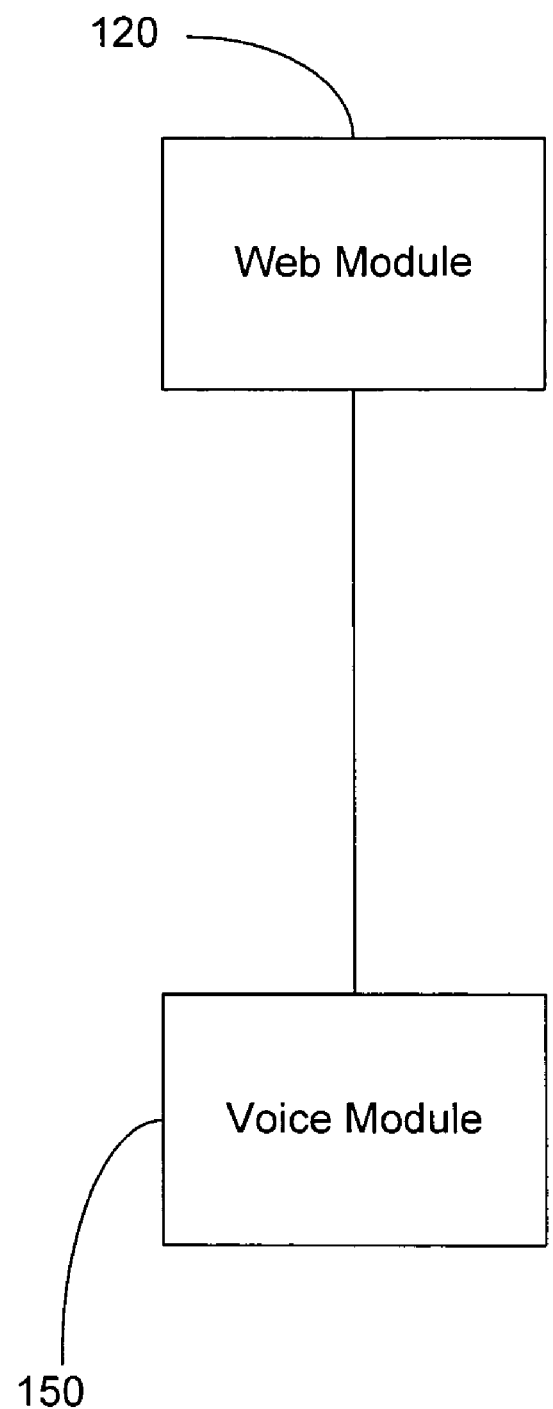
Figure 1. Voice Portal

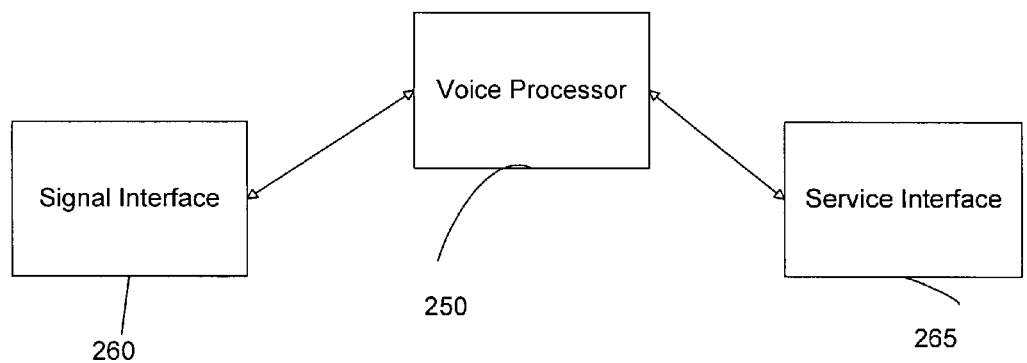
Figure 2. Voice Module

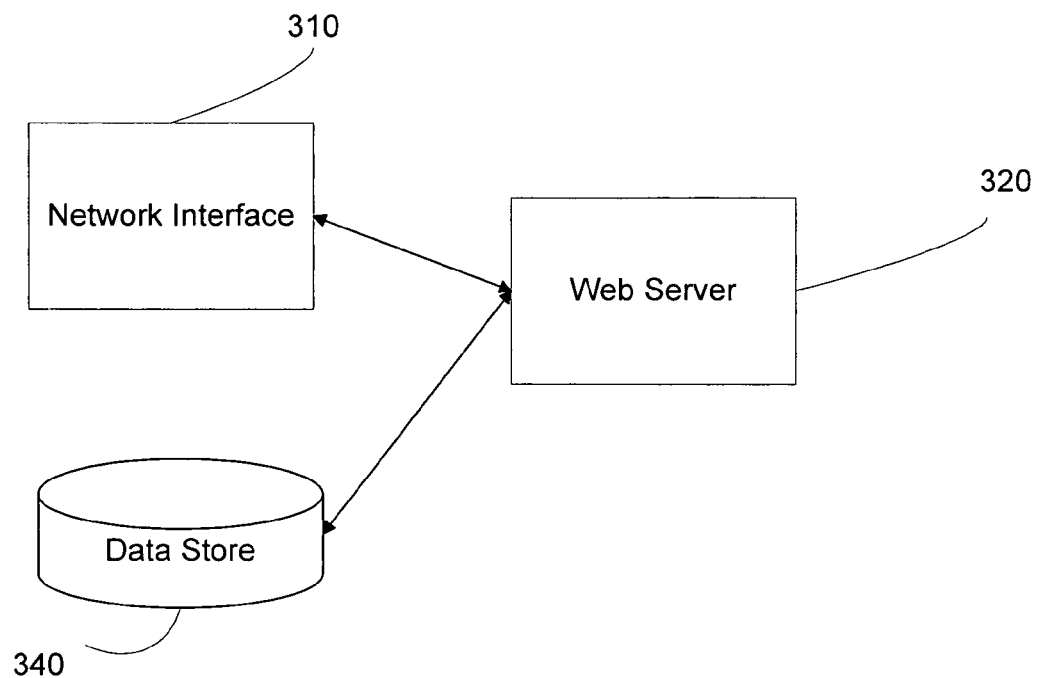
Figure 3. Web Module

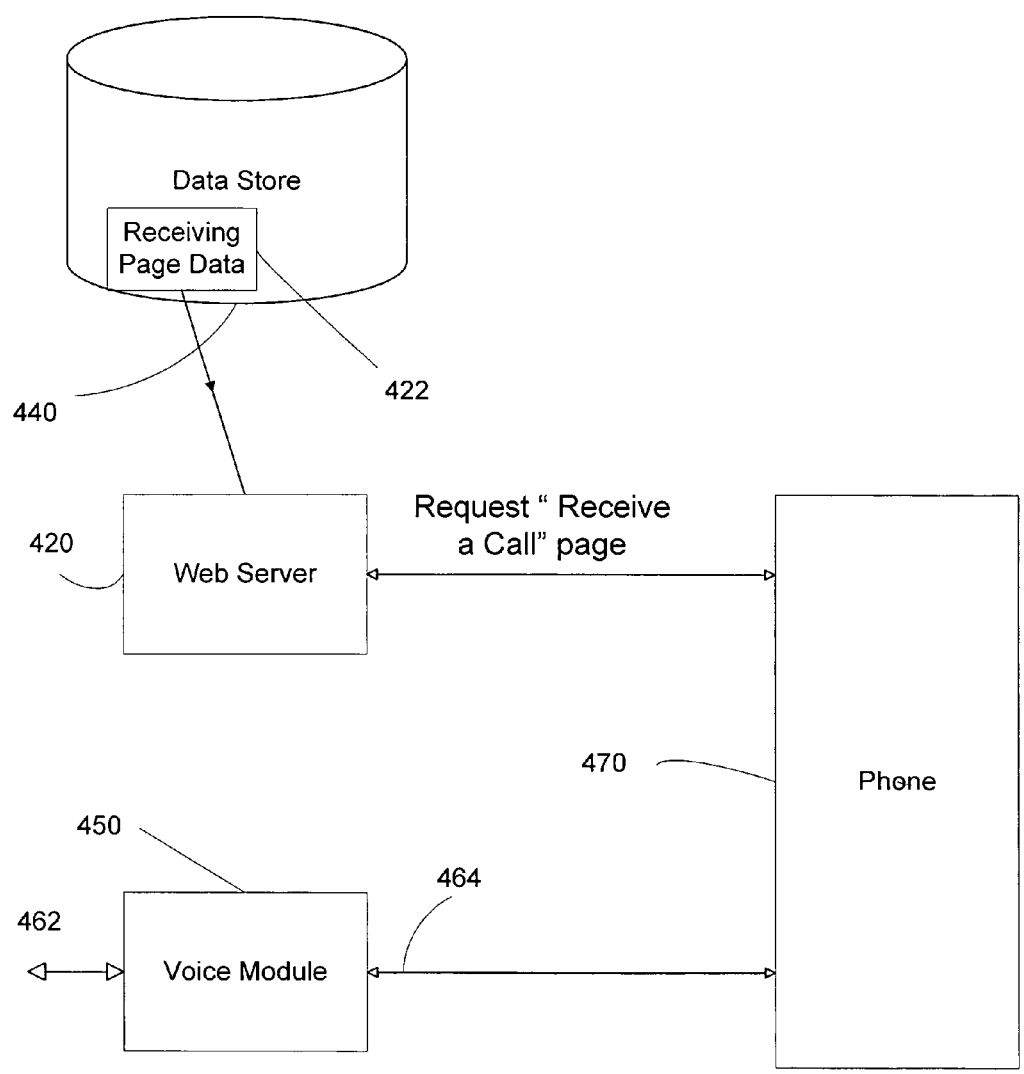
Figure 4. Receiving a Call

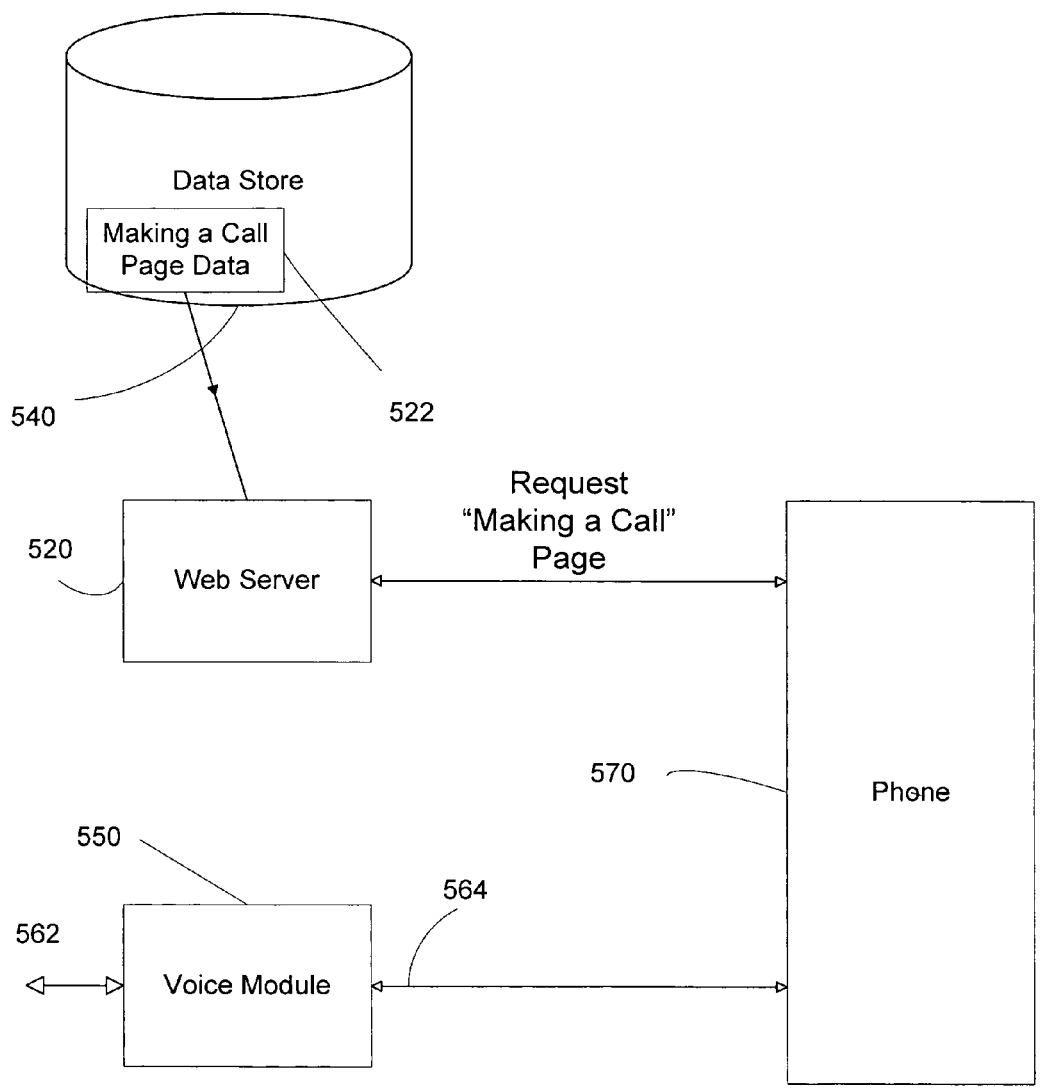
Figure 5. Making a Call

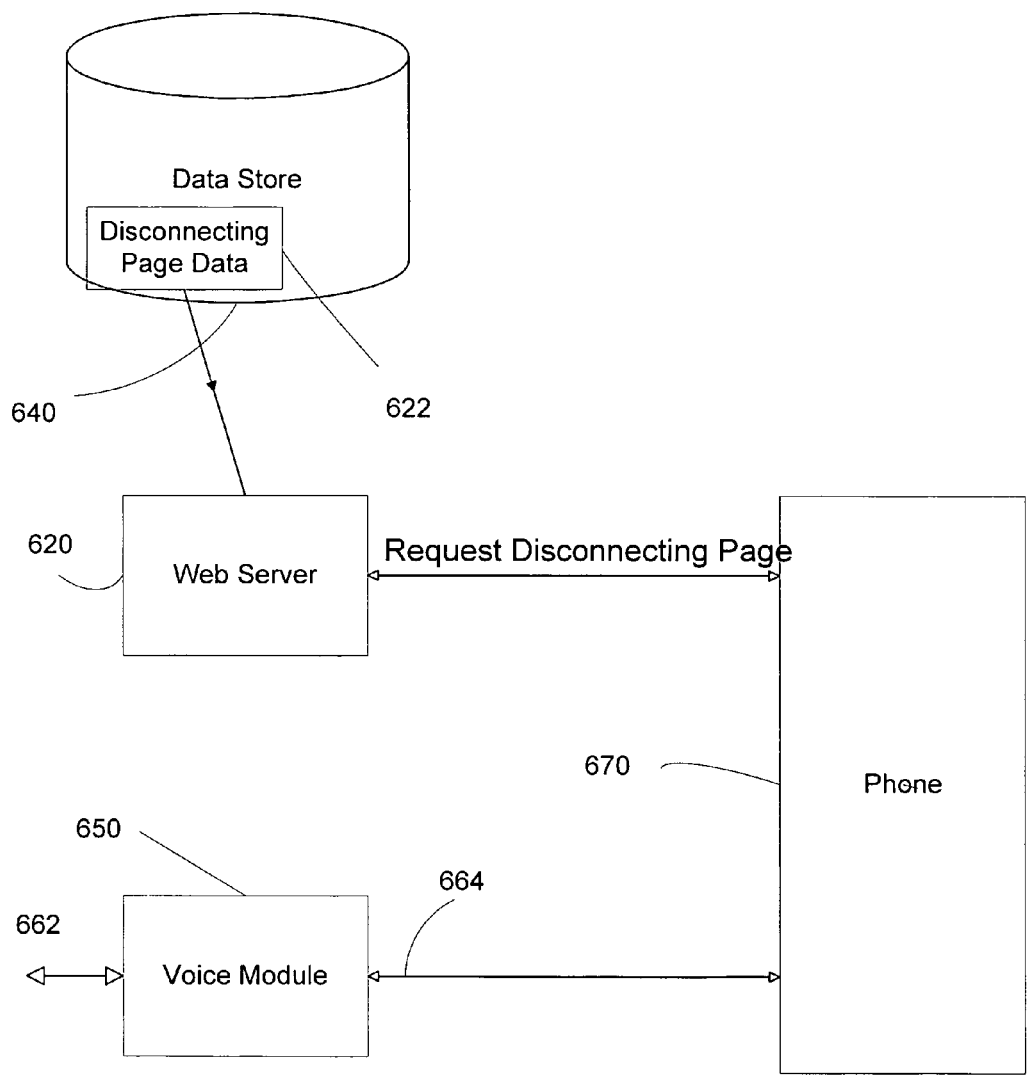
Figure 6. Dropping a Call

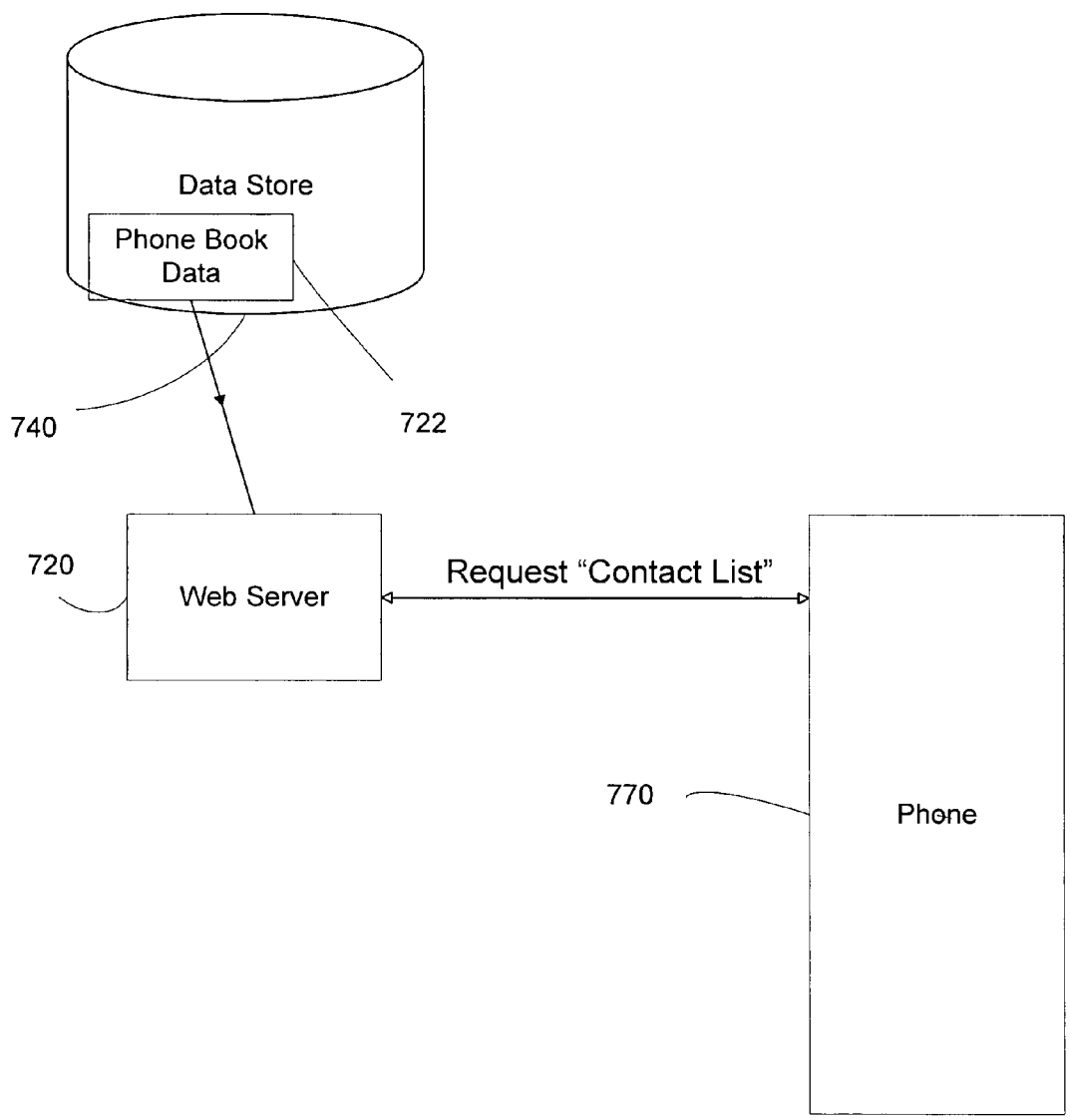
Figure 7. Accessing a Contact List

APPARATUS AND METHOD FOR A VOICE PORTAL

BACKGROUND

1. Field

This invention relates generally to telecommunications, more specifically, to an apparatus combining a web module and a voice module, wherein the web module controls one or more telephones and the voice module bridges between the telephones and telephony services.

2. Related Art

Cordless telephones have become a commodity household item. The convenience and flexibility provided by a telephone handset not physically attached to a telephone jack or an electrical outlet fits well with modern life. In addition, the price of cordless telephones has been declining steadily while the quality has been improving. Nevertheless, cordless telephones are primarily designed for voice communication. Their ability to handle data is extremely limited. The most common data application with current cordless telephones is limited to simple memory-stored speed-dial numbers.

As consumers grow more technologically savvy, they are continuously seeking more sophisticated integration of voice, data and other features to make life more convenient and productive. The trend is apparent in mobile voice services as well as entertainment devices such as MP3 music players and portable video players. Currently cellular telephones are fully capable of supporting voice communication features such as voice tags as well as data applications such as text, picture, and video messaging and Internet browsing. The differences in capabilities between household telephones and cellular telephones represent an interesting contrast of otherwise similar modern conveniences. Therefore there is a need to upgrade the household telephone with data technologies to be in par with other data voice integrated technologies. These upgraded telephones are to be served for their telephony usage as well as their data functionality. Therefore there is a need to provide a platform combining voice functionality and data functionality to serve the upgraded telephones.

SUMMARY

This invention resides in an apparatus and method to use and operate a voice portal. A voice portal is a remote device that enables customizable functionality of telephones connected to it. The portal is connected to telephones with separate voice and data interfaces. The voice interface of the voice portal handles the transmission of voice signals coming to and from the telephones through one or more telephony networks. The data interface handles receiving requests from the phones, retrieving the requested data from memory and transmitting the data back to the telephones. Additionally, the voice portal can be capable of connecting to telephones and devices of various protocols simultaneously, thus providing a solution to centrally control and operate wired telephones, cordless telephones, cellular telephones and data services. Since the voice portal is capable of dispersing customizable functionality, it is possible to use the voice portal as an interface for controlling multimedia, entertainment, facility control and other functions.

BRIEF DESCRIPTION OF DRAWINGS

FIG. 1 is a block diagram illustrating a voice portal.
FIG. 2 is a block diagram illustrating a voice module.
FIG. 3 is a block diagram illustrating a web module.
FIG. 4 is a block diagram illustrating receiving a call over a voice portal.
FIG. 5 is a block diagram illustrating making a call over a voice portal.
FIG. 6 is a block diagram illustrating dropping a call over a voice portal.
FIG. 7 is a block diagram illustrating accessing a contact list over a voice portal.

DETAILED DESCRIPTION

Voice Portal

FIG. 1 shows a voice portal comprising a web module 120 and a voice module 150. A voice portal typically connects to one or more telephones and to a telephony network.

In one embodiment, a voice portal can be connected for use with an internal telephone system only and the voice portal cannot connect to any telephony network.

In one embodiment, the voice portal is used for residential purposes. The voice portal is connected to a public telephony network.

In one embodiment, the voice portal is connected to a private telephony network such as a PBX system or other corporate telephony network.

In one embodiment, the voice portal is connected to a plurality of telephony networks.

The voice module 150 can be connected to one or more telephones and can be connected to one or more telephony networks. The web module 120 communicates to the telephones and serves the requests from the telephones.

In one embodiment, the voice portal is connected to a plurality of telephones that are capable of voice and data processing. These telephones request web pages from the voice portal through the web module 120, and conduct the telephone calls through the voice portal by connecting to the voice module 150.

FIG. 2 illustrates voice module 150. In the figure, the voice module contains a voice processor 250, a signal interface 260, and a service interface 265. The signal interface 260 typically connects to one or more telephones.

In one embodiment, the signal interface 260 connects to a cordless telephone. The signal interface 260 can transmit and receives signals through an antenna.

In one embodiment, the signal interface 260 connects to an IP telephone. The signal interface 260 contains a packet-based network interface, and is capable of handling voice over IP packets.

In one embodiment, the signal interface 260 is connected to a telephone with a physical wire connection. The service interface 265 connects to a telephony system of a telephony network.

In one embodiment, the service interface 265 connects to a Class 5 telephony switch of the public switch telephone network (PSTN).

In one embodiment, the service interface 265 connects to a soft-switch of a voice over IP telephony network. The voice processor 250 processes input voice packets and signals from the signal interface 260 and the service interface 265 and outputs the voice packets and signals back to the signal interface 260 and the service interface 265.

In one embodiment, the voice module does not have a service interface 265 or the service interface 265 is not connected to any telephony network. The voice processor 250 processes input voice signals from the signal interface 260 and output the voice signals to the signal interface 260.

In one embodiment, the service interface 265 is connected to a plurality of telephony networks. The voice processor 250 processes inputs voice signals from the service interface 265 and outputs the signals to the same service interfaces 265.

FIG. 3 illustrates a web module 120. The network interface 310 allows the web module 120 to communicate with the telephones served by the voice portal. The web server 320 serves requests from the browsers running on the telephones. When a browser of a telephone requests information, the web server 320 determines and retrieves the corresponding information from the data store 340. The interaction between the web server 320 and the browser on the telephone allows the voice portal to control the behavior of the telephone; in particular the procedures of making a telephone call, receiving a telephone call, and dropping a telephone call. These procedures will be illustrated later in this description.

Receiving a Call

FIG. 4 illustrates a method to receive a call. When a telephone is ready to receive a call, it requests a receiving a call page from the voice portal.

In one embodiment, the telephone is powered on as it is plugged into an electric outlet, and is ready to receive a telephone call.

In one embodiment, the telephone just drops a previous telephone call and is now ready to receive the next telephone call. Web server 420 retrieves the receiving page data 422 from the data store 440, composes a receiving a call page, and provides the page to the telephone. When an incoming call is detected, a telephone call indication is received from the service interface 462. The telephone call indication may be received from the signal interface 464 if the call is an internal call from another telephone. The voice processor 450 translates the telephone call indication and transmits it over to the signal interface 464. The telephone 470 receives the telephone call indication and alerts the user. As the user accepts and answers the telephone call, a signal is transmitted from the telephone to the signal interface 464 indicating acceptance of the telephone call. The voice processor 450 translates the signal and transmits it to the service interface 462 or the signal interface 464. Once the telephone call is established, the phone is can be capable of loading and executing another function web page from the voice portal such as disconnecting the telephone call.

Making a Call

FIG. 5 illustrates a method to make a call. To place a telephone call telephone 570 requests a making a call page from the voice portal. The web server 520 retrieves the making a call page data 522 from the data store 540, composes a making a call page, and provides the page to the telephone 570. Based on the guidance of the making a call page, the user dials the calling number. The calling number is transmitted from the telephone 570 over the signal interface 564. When voice processor 550 receives the calling number signals, it translates the signals into appropriate signals for the service interface 562. When the telephone system at the other end of the service interface 562 receives the calling number signals, the telephone system transmits certain signals back to the service interface 562. For example, the telephone system transmits a dial tone before receiving the first calling number signals; then transmits silence during the receipt of the calling number signals; and transmits either a busy tone or a ring tone after receiving and processing the calling number signals. Throughout the telephone call, the voice processor 550 processes signals back and forth from the signal interface 564 to the service interface 562 and from the service interface 562 to the signal interface 564, as described in FIG. 2.

In one embodiment, the user wants to call another user internally using another telephone attached to the signal interface 564. The method is similar to that above description. After successfully making a call, the telephone is capable of requesting a different web page from the voice portal, such as a disconnecting page.

Disconnecting a Call

FIG. 6 illustrates a method to drop a call. As illustrated in FIGS. 4 and 5, telephone 670 can receive or make telephone call. Once a telephone call is initiated, telephone 670 is capable of retrieving other function web pages, such as a disconnecting page, from web server 620 through the voice portal.

In one embodiment, the telephone 670 requests a disconnecting page to drop a telephone call. The web server 620 retrieves the disconnecting page data 622 from the data store 640, composes a disconnecting page, and provides the page to the telephone 670. When the telephone call is finished, the disconnecting page provides instructions to drop the telephone call. The telephone 670 signals through the signal interface 664 to the voice module 650 of the termination of the telephone call. The voice module 650 translates the signal to the service interface 662. The call is now dropped.

In one embodiment, the telephone does not request any information from the web module 620 and the call is dropped when telephone 670 is hung up. Telephone 670 signals through the signal interface 664 to the voice module 650 of the termination of the telephone call.

In one embodiment, when the users on the other end of the telephone call drops the telephone call, the voice module 650 continues translating the signal from the service interface 662 to the signal interface 664. The user eventually drops the telephone call.

In one embodiment, the telephone call is an internal telephone call between two telephones attached to the signal interface 664. The method is similar to the above description. After the call is terminated, telephone 670 may request a Making a call page to allow the user to make another telephone call, as illustrated in FIG. 5; or the telephone 670 may request a Receive a call page to listen for incoming calls, as illustrated in FIG. 4.

Accessing a Contact List

FIG. 7 illustrates a method to access a contact list. Telephone 770 is capable of requesting access to a contact list page from the web server 720.

In one embodiment, the telephone 770 has a telephone list button when pressed triggers the telephone 770 to request a contact list page.

In one embodiment the telephone 770 displays an interface viewing a page that includes an option to retrieve a telephone contact list. The option can be selected to trigger the telephone 770 to request the contact list page. The web server 720 retrieves the contact list data 722 from the data store 740, composes a contact list page, and provides the contact list page to the telephone 770.

In one embodiment, the telephone list can be modified. A new entry can be added or an existing entry can be modified from telephone 770, via a web browser run on a computer or at the voice portal. When the editing is done using telephone 770, telephone 770 is capable of saving the changes. Telephone 770 posts the modifications to the web server 720. The web server 720 receives the modifications and integrates them into the telephone contact list data 722 in the data store 740.

Other Voice and Data Services

The above illustrations demonstrate how a voice portal serves the telephones in making a call, dropping a call, receiving a call and accessing a telephone contact list. Similar methods serve other kinds of voice and data services.

In one embodiment, the voice portal contains a number of ring tones in the data store. Telephone 770 is capable of retrieving a ring tone page that lists a number of ring tones available on the voice portal. The web server 720 retrieves the ring tone data from the data store 740, composes a ring tone list page and provides the page to the telephone 770. When a ring tone is selected telephone 770 can retrieve the ring tone from the voice portal and use the ring tone as the call indication. Telephone 770 requests the selected ring tone from the web server 720. The web server 720 retrieves the ring tone file from the data store and provides the ring tone file to the telephone 770.

In one embodiment, the user desires to have different ring tones for different incoming caller numbers. The user instructs the telephone 770 to access the contact list page and creates a telephone list with a specified ring tone. The receiving a call page 422 has instructions to, upon receiving an incoming call indication, receive the incoming caller number, query the telephone contact list data 722 through the web server 720, determine the ring tone based on the telephone contact list data 722, retrieve the ring tone file from the data store 740 through the web server 720 and play the specified ring tone.

In one embodiment, the ring tone file is cached in the telephone. The receiving a call page 422 retrieves the ring tone file from the telephone's cache.

In one embodiment, the receiving a call page 422 can display information about the incoming caller number. The information, retrieved from the contact list data 722, may include the name, address, telephone number, relationship to the user, business information, personal information, history of past telephone calls and other activities.

In one embodiment, the information continues to be displayed throughout the telephone conversation. After the telephone call is dropped, the telephone call session information is stored into the data store 740 by the disconnecting page as illustrated in FIG. 7.

In one embodiment, the web module 120 is connected to the voice module 150. The web module 120 can interact with the voice module 150, based on the action specified by the web page data in the data store. The web page data are constructed into web pages based on the requests from the telephones. Upon execution of the web pages by the telephones, the web pages further make requests and queries to the voice portal. The web module 120 acts on the requests and queries, and interacts with the voice module 150 accordingly.

In one embodiment, the voice portal serves two or more telephones. These telephones interactively request and query the web module 120 while they conduct voice calls through the voice module 150. The information provided by one telephone can be relayed to another telephone through the voice portal.

In one embodiment, two or more telephones can set up an intercom through the web module 120 with an appropriate web page that interacts with the telephones, and the intercom is conducted by relaying the voice signals between the telephones through the voice module 150.

In one embodiment, the intercom includes one or more telephone sessions with an external telephone network.

In one embodiment, the data store 440 contains a plurality of media files such as songs files. The web module 120 can instruct the voice module 150 to play the audio files. A telephone requests an audio file list web page from the web module 120, selects a plurality of audio files, and requests the web module 120 to play the selected audio files. The web module 120, upon receipt of the request, instructs the voice module 150 to create a voice session with the telephone, and to play the audio files. Optionally, voice module 150 creates voice sessions with one or more external telephones and broadcasts the audio stream to one or more of the telephones.

In one embodiment, the data store 440 does not contain all the audio files in the list of audio files or the audio file list. The web server 320 further has the ability to go to another web server to request the additional audio files. Upon receipt of the request from a telephone, the web server 320 goes to another web server for the audio file list and the audio files before instructing the voice module 150 to play the audio files.

In one embodiment, the voice module 150 can duplicate a voice session. One telephone can monitor another telephone by requesting the web module 120 to set up the duplication capability of the voice module 150 of all voice session from a specified telephone. The duplicated voice session is relayed to the originating telephone.

In one embodiment, the voice module 150 redirects the duplicated voice session to an answering machine or other voice message service. In this way the telephone conversation can be recorded.

In one embodiment, the voice module 150 stores the duplicated voice session in the data store 440 for later retrieval.

In a one embodiment, the voice session is converted to text before storing.

Since there is a desire to drive the cost of consumer electronics down, it is often useful to combine the functionality of various devices into one device. The trend towards integration of capabilities is apparent in the mobile phone industry in which it is commonplace to integrate the functionality of a mobile phone, web browser, and multimedia functions such as digital image capture. Analogously, the capabilities of a voice portal can include other telephony and data functionality in addition to the functionality already described.

In one embodiment, the voice portal further includes residential or SOHO broadband gateway. The gateway can be either wired or wireless using protocols such as Ethernet, 802.11a/b/g or Bluetooth. Such a device could then be integrated into a home or SOHO computer network thus adding intranet-browsing capabilities to the telephones that the voice portal services.

Optionally, the voice portal further includes the capabilities of a broadband modem such as a DSL or cable modem, so that voice portal, as a single device, can not only provide telephony support to the telephones it serves, but also connect to the Internet, share the connection and provide data browsing support.

In one embodiment, the voice portal includes software, firmware, or an ASIC to decode, play or view multimedia content from internal memory, an intranet, or the Internet. Such an embodiment would allow for telephones that the voice portal serves to play digital audio including, but not limited to, MP3, WMA, AAC, or other file formats.

Optionally, the voice portal can include software, firmware, or an ASIC to decode or display video or still images from digital video and still image formats including, but limited to, MPEG, JPEG, TIFF, bitmaps and other available file formats.

In one embodiment, the voice portal includes streaming video or stop motion still imaging capability. Such a capabilities can be useful in the implementation of a security system. The voice portal has the capability to manage streaming video or stop motion imaging from wired or wireless network cameras and provide the data to be displayed on the telephones it serves. This would add additional convenience to facility access systems with which a user can view a visitor requesting access before remotely granting them access to a building.

Optionally, the voice portal can include intercom capabilities so that a user can, in addition to seeing a visitor at the entry point of a building, can also talk to the visitor to help ascertain their identity and purpose.

In one embodiment, the voice portal integrates the capability to communicate with wireless and cellular telephones, thus expanding the range of telephones and telephone protocols that can use the services provided by the voice portal.

In one embodiment, the voice portal integrates a home entertainment center and information portal. The home entertainment system capabilities include, but are not limited to, digital video recorder (DVR), storage or playback of digital multimedia data, DVD and CD playback and a digital media drive for formats including, but limited to, secure data, compact flash, memory stick, multimedia cards.

Optionally, the voice portal could also include a decoder for digital cable television services or digital satellite television services.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by claims following.

I claim:

1. An apparatus for a voice portal comprising:
   a voice module for handling transmissions of voice signals between the voice portal and one or more telephones or between the voice portal and one or more telephony networks; and
   a web module for handling data requests for a page or pages for controlling behavior of the one or more telephones, wherein the page or pages comprises a receiving a call page comprising instructions for the one or more telephones to receive a telephone call initiated from the one or more telephony networks through the voice module.

2. The voice portal of claim 1 wherein said voice module comprises:
   a voice processor for processing voice packets or voice signals from a signal interface or from a service interface;
   the signal interface for receiving voice packets or voice signals form the one or more telephones and outputting the processed voice packets or voice signals from the service interface to the one or more telephones; and
   the service interface for receiving voice packets or voice signals from the one or more telephony networks and outputting the processed voice packets or voice signals from the signal interface to the one or more telephony networks.

3. The voice portal of claim 2 wherein said signal interface can connect to a cordless telephone and sends and receives signals though an antenna.

4. The voice portal of claim 2 wherein said signal interface can connect to an IP telephone and is capable of handling voice over IP packets.

5. The voice portal of claim 2 wherein said signal interface can connect to the one or more telephones with a physical wire connection and said service interface can connect to a telephony system of the one or more telephony networks.

6. The voice portal of claim 2 wherein said service interface can connect to a Class 5 telephony switch of a public switch telephone network (PSTN).

7. The voice portal of claim 2 wherein said service interface can connect to a soil switch of a voice over IP telephone network, wherein said voice processor can process input voice packets and signals from the signal interface and the service interface and can output voice packets and signals back to the signal interface and the service interface.

8. The voice portal of claim 1, wherein said web module comprises:
   a network interface for communicating with one or more data networks or with the one or more telephones;
   a web server for servicing data requests from browsers running on the one or more telephones; and
   a data store, wherein when the browsers request a page or pages, the we server determines and retrieves the page or pages from the data store.

9. The voice portal of claim 8 wherein said data network is a Wi-Fi network.

10. The voice portal of claim 8 wherein said data network is an Ethernet network.

11. The voice portal of claim 8 wherein said data network is IP compliant network.

12. A method for executing one or more functions on a telephone with a voice portal comprising the steps of:
    providing for a telephone;
    providing for a voice portal comprising:
      a web module for handling data requests from the telephone, wherein the data requests comprise at least one telephone control request; and
      a voice module for handling transmissions of voice signals between the voice portal and the telephone and between the voice portal and a telephone network, and
    providing for a data store,
    wherein said telephone sends the at least one telephone control request to said web module for a page or pages for controlling behavior of the telephone and said web module retrieves the requested page or pages from said data store and send requested pages back to said telephone for execution, wherein the requested page or pages comprises a receiving a call page comprising instructions for the telephone to receive a telephone call initiated from the voice telephone network through the voice module.

13. The method of claim 12 wherein the requested page or pages further comprise a making a call page comprising instructions for the telephone to make a telephone call to the voice telephone network through the voice module.

14. The method of claim 12 wherein the requested page or pages further comprise a drop a call page comprising instructions for the telephone to disconnect a telephone call between the telephone and the voice telephone network.

15. The method of claim 13 wherein the requested page or pages further comprise a contact list page comprising instructions for the telephone to access a contact list stored on said data store.

16. The voice portal of claim 1 further comprising a broadband gateway, a decoder or player for playing digital multimedia content, means for delivering live images from network cameras to telephones served by the voice portal, means for connecting to cellular or wireless phones wherein the said cellular or wireless telephones have access to one or more service available to other telephones served by the voice portal, or means for playing or recording live broadcast, previously record, or stored home entertainment multimedia content.

17. The voice portal of claim 2 further comprising a broadband gateway, a decoder or player for playing digital multimedia content, means for delivering live images from network cameras to telephones served by the voice portal, means for connecting to cellular or wireless phones wherein the said cellular or wireless telephones have access to one or more service available to other telephones served by the voice portal, or means for playing or recording live broadcast, previously record, or stored home entertainment multimedia content.

18. The voice portal of claim 3 further comprising a broadband gateway, a decoder or player for playing digital multimedia content, means for delivering live images from network cameras to telephones served by the voice portal, means for connecting to cellular or wireless phones wherein the said cellular or wireless telephones have access to one or more service available to other telephones served by the voice portal, or means for playing or recording live broadcast, previously record, or stored home entertainment multimedia content.

19. The voice portal of claim 4 further comprising a broadband gateway, a decoder or player for playing digital multimedia content, means for delivering live images from network cameras to telephones served by the voice portal, means for connecting to cellular or wireless phones wherein the said cellular or wireless telephones have access to one or more service available to other telephones served by the voice portal, or means for playing or recording live broadcast, previously record, or stored home entertainment multimedia content.

20. The voice portal of claim 5 further comprising a broadband gateway, a decoder or player for playing digital multimedia content, means for delivering live images from network cameras to telephones served by the voice portal, means for connecting to cellular or wireless phones wherein the said cellular or wireless telephones have access to one or more service available to other telephones served by the voice portal, or means for playing or recording live broadcast, previously record, or stored home entertainment multimedia content.

21. The voice portal of claim 6 further comprising a broadband gateway, a decoder or player for playing digital multimedia content, means for delivering live images from network cameras to telephones served by the voice portal, means for connecting to cellular or wireless phones wherein the said cellular or wireless telephones have access to one or more service available to other telephones served by the voice portal, or means for playing or recording live broadcast, previously record, or stored home entertainment multimedia content.

22. The voice portal of claim 7 further comprising a broadband gateway, a decoder or player for playing digital multimedia content, means for delivering live images from network cameras to telephones served by the voice portal, means for connecting to cellular or wireless phones wherein the said cellular or wireless telephones have access to one or more service available to other telephones served by the voice portal, or means for playing or recording live broadcast, previously record, or stored home entertainment multimedia content.

23. The voice portal of claim 8 further comprising a broadband gateway, a decoder or player for playing digital multimedia content, means for delivering live images from network cameras to telephones served by the voice portal, means for connecting to cellular or wireless phones wherein the said cellular or wireless telephones have access to one or more service available to other telephones served by the voice portal, or means for playing or recording live broadcast, previously record, or stored home entertainment multimedia content.

24. The voice portal of claim 9 further comprising a broadband gateway, a decoder or player for playing digital multimedia content, means for delivering live images from network cameras to telephones served by the voice portal, means for connecting to cellular or wireless phones wherein the said cellular or wireless telephones have access to one or more service available to other telephones served by the voice portal, or means for playing or recording live broadcast, previously record, or stored home entertainment multimedia content.

25. The voice portal of claim 10 further comprising a broadband gateway, a decoder or player for playing digital multimedia content, means for delivering live images from network cameras to telephones served by the voice portal, means for connecting to cellular or wireless phones wherein the said cellular or wireless telephones have access to one or more service available to other telephones served by the voice portal, or means for playing or recording live broadcast, previously record, or stored home entertainment multimedia content.

26. The voice portal of claim 11 further comprising a broadband gateway, a decoder or player for playing digital multimedia content, means for delivering live images from network cameras to telephones served by the voice portal, means for connecting to cellular or wireless phones wherein the said cellular or wireless telephones have access to one or more service available to other telephones served by the voice portal, or means for playing or recording live broadcast, previously record, or stored home entertainment multimedia content.

27. The voice portal of claim 1 wherein the requested page or pages further comprises a making a call page comprising instructions for the one or more telephones to make a telephone call to the one or more telephony networks through the voice module.

28. The voice portal of claim 1 wherein the requested page or pages further comprises a drop a call page comprising instructions for the one or more telephones to disconnect a telephone call between the one or more telephones and the one or more telephony networks.

29. The voice portal of claim 27 wherein the requested page or pages further comprises a contact list page comprising instructions for the one or more telephones to access a contact list stored on a data store.

30. The voice portal of claim 29 wherein the one or more telephones can further edit the contact list stored on the data store, wherein the one or more telephones accesses the data store via a network interface.

31. The method of claim 15, wherein the telephone can further edit the contact list stored on the data store, wherein the telephone accesses the data store via a network interface.

* * * * *